United States Patent
Zhou et al.

(10) Patent No.: US 9,202,632 B2
(45) Date of Patent: Dec. 1, 2015

(54) DOUBLE-CENTER QUATERNARY AMMONIUM SALT ION LIQUID, PREPARATION METHOD THEREFOR AND USE THEREOF

(75) Inventors: Mingjie Zhou, Shenzhen (CN); Daxi Liu, Shenzhen (CN); Yaobing Wang, Shenzhen (CN)

(73) Assignees: OCEAN'S KING LIGHTING SCIENCE & TECHNOLOGY CO., LTD., Shenzhen (CN); SHENZHEN OCEAN'S KING LIGHTING ENGINEERING CO., LTD., Shenzhen (CN)

( * ) Notice: Subject to any disclaimer, the term of this patent is extended or adjusted under 35 U.S.C. 154(b) by 185 days.

(21) Appl. No.: 14/234,378

(22) PCT Filed: Aug. 30, 2011

(86) PCT No.: PCT/CN2011/079107
§ 371 (c)(1),
(2), (4) Date: Jan. 22, 2014

(87) PCT Pub. No.: WO2013/029236
PCT Pub. Date: Mar. 7, 2013

(65) Prior Publication Data
US 2014/0158928 A1 Jun. 12, 2014

(51) Int. Cl.
*H01G 9/022* (2006.01)
*H01G 9/035* (2006.01)
*H01G 11/62* (2013.01)
*H01G 11/60* (2013.01)

(52) U.S. Cl.
CPC ............... *H01G 9/035* (2013.01); *H01G 11/62* (2013.01); *H01G 11/60* (2013.01); *Y02E 60/122* (2013.01); *Y02E 60/13* (2013.01)

(58) Field of Classification Search
CPC .............................. H01G 9/035; Y02E 60/122
See application file for complete search history.

(56) References Cited

U.S. PATENT DOCUMENTS

| | | | | |
|---|---|---|---|---|
| 4,721,512 A * | 1/1988 | Topfl | ........................ | D06P 5/08 8/181 |
| 4,851,138 A * | 7/1989 | Jaroschek | ................ | C11D 1/52 510/307 |
| 5,130,177 A * | 7/1992 | Lu | .......................... | G03G 5/101 428/195.1 |
| 5,594,045 A * | 1/1997 | Alexiou | ................. | C09D 10/00 106/31.75 |
| 2004/0151746 A1* | 8/2004 | Dubief | ..................... | A61K 8/06 424/401 |

FOREIGN PATENT DOCUMENTS

| | | |
|---|---|---|
| CN | 101228602 A | 7/2008 |
| CN | 102020630 A | 4/2011 |
| JP | 2002151360 A | 5/2002 |
| JP | 2005104845 A | 4/2005 |

OTHER PUBLICATIONS

Derwent Abstract 2011-H32483, for CN 102060715, May 18, 2011.*

* cited by examiner

*Primary Examiner* — Carol M Koslow
(74) *Attorney, Agent, or Firm* — Shimokaji IP

(57) ABSTRACT

A double-center quaternary ammonium salt ion liquid having the structural formula (I), wherein n=2, 3 or 6, $Y^-$ is $BF_4^-$, $PF_6^-$, $(FSO_2)_2N^-$, $(CF_3SO_2)_2N^-$ or $CF_3S_3^-$. Also provided is a method for preparing a double-center quaternary ammonium salt ion liquid. The double-center quaternary ammonium salt ion liquid has high stability, and thus an electrolyte containing the double center quaternary ammonium salt ion liquid has a high decomposition voltage.

(I)

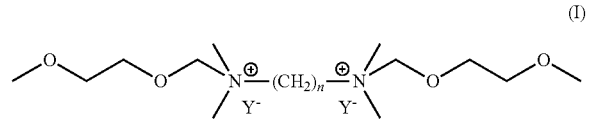

9 Claims, 1 Drawing Sheet

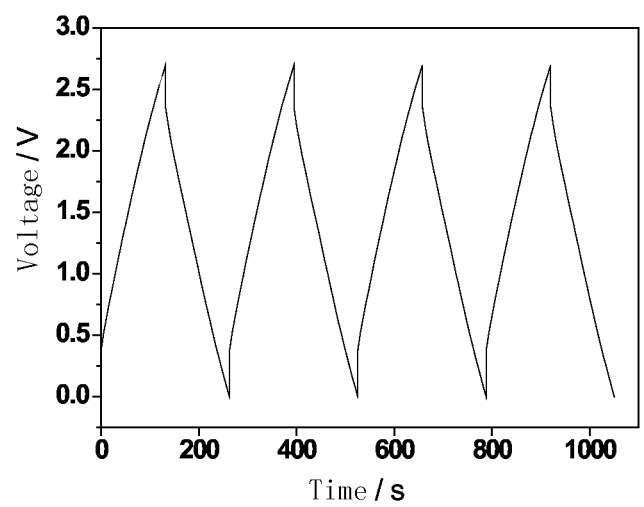

DOUBLE-CENTER QUATERNARY AMMONIUM SALT ION LIQUID, PREPARATION METHOD THEREFOR AND USE THEREOF

FIELD OF THE INVENTION

The present invention relates to ionic liquid, particularly to a double-center quaternary ammonium salt ionic liquid, preparation method thereof, an electrolyte comprising the same, and preparation method thereof.

BACKGROUND OF THE INVENTION

Ionic liquids are organic matters that are liquid totally consisting of ions at room temperature or near room temperature. As a new electrolyte, ionic liquids exhibit a range of advantageous properties such as wide electrochemical potential window range, non-volatile, nonflammable and good thermal stability. Ionic liquids are promising electrolytes for double-layer capacitors. Traditional electrolytes are prone to decompose at high voltage, causing a sharp rise of internal resistance and a rapid fall of capacitance. Therefore stability of electrolyte is critical factor in specific energy of capacitor.

SUMMARY OF THE INVENTION

In view of this, it is necessary to provide double-center quaternary ammonium salt ionic liquid of high stability.

In addition, it is also necessary to provide a method for preparing double-center quaternary ammonium salt ionic liquid of high stability.

In addition, it is also necessary to provide use of the double-center quaternary ammonium salt ionic liquid in electrolyte, and preparation method thereof.

A double-center quaternary ammonium salt ionic liquid having the following structural formula:

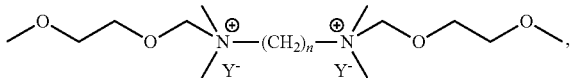

wherein n=2, 3 or 6, $Y^-$ is $BF_4^-$, $PF_6^-$, $(FSO_2)_2N^-$, $(CF_3SO_2)_2N^-$ or $CF_3SO_3^-$.

A method for preparing double-center quaternary ammonium salt ionic liquid, comprising:

step 1: mixing double-center quaternary ammonium salt with haloalkane in a molar ratio of 1:2~1:2.5, then heating to 60~80° C.; reacting while stirring to obtain alkyl double-center quaternary ammonium halide, wherein said double-center quaternary ammonium salt is N,N,N',N'-tetramethyl-ethane-1,2-diamine, N,N,N',N'-tetramethyl-1,3-diaminopropane or N,N,N',N'-tetramethyl-1,6-hexanediamine; said haloalkane is methoxyethoxymethyl chloride or methoxyethoxymethyl bromide;

step 2: mixing the alkyl double-center quaternary ammonium halide prepared in step 1 with salt having a formula of $M^+Y^-$ in a molar ratio of 1:2, then adding into deionized water; carrying out an ion exchange reaction while stirring; purifying and then obtaining a double-center quaternary ammonium salt ionic liquid having the following structural formula:

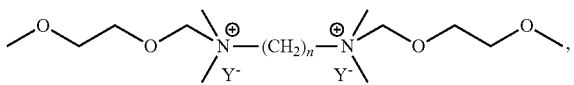

wherein n=2, 3 or 6, $M^+$ is $Na^+$, $K^+$ or $NH_4^+$, $Y^-$ is $BF_4^-$, $PF_6^-$, $(FSO_2)_2N^-$, $(CF_3SO_2)_2N^-$ or $CF_3SO_3^-$.

In some preferred embodiments, in step 1, the step of reacting said double-center quaternary ammonium salt with haloalkane is carried out for 24~72 h; reaction liquid is cooled and then washed with ethyl acetate to get washed matter; the washed matter is dried under vacuum to obtain purified alkyl double-center quaternary ammonium halide.

In some preferred embodiments, in step 1, the step of reacting the double-center quaternary ammonium salt with haloalkane is carried out in protective atmosphere of nitrogen or argon.

In some preferred embodiments, the ion exchange reaction of step 2 is carried out at room temperature for 8~24 h.

In some preferred embodiments, the step of purifying of step 2 comprises:

subjecting mixed liquid obtained after the reaction of alkyl double-center quaternary ammonium halide with salt having a formula of $M^+Y^-$ to extraction with dichloromethane to get aqueous phase, until no precipitation occurs in the aqueous phase when saturated aqueous solution of $AgNO_3$ is added;

evaporating and concentrating extracts in dichloromethane then drying under vacuum to obtain double-center quaternary ammonium salt ionic liquid.

An electrolyte, comprising double-center quaternary ammonium salt ionic liquid, organic solvent and lithium salt, wherein said double-center quaternary ammonium salt ionic liquid has the following structural formula:

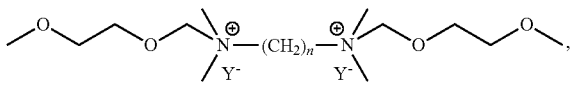

wherein n=2, 3 or 6, $Y^-$ is $BF_4^-$, $PF_6^-$, $(FSO_2)_2N^-$, $(CF_3SO_2)_2N^-$ or $CF_3SO_3^-$, mass ratio of said organic solvent to said double-center quaternary ammonium salt ionic liquid is in the range of 0~100, concentration of said lithium salt is in the range of 0.3 mol/L~1.2 mol/L.

In some preferred embodiments, lithium salt is at least one of lithium tetrafluoroborate, lithium hexafluorophosphate, lithium bis(trifluoromethanesulphonyl)imide and lithium bis (fluorosulfonyl)imide.

In some preferred embodiments, organic solvent is at least one of ethylene carbonate, ethyl methyl carbonate, dimethyl carbonate and ethyl propionate.

A method for preparing electrolyte, comprising:

step 1: providing organic solvent, adding double-center quaternary ammonium salt ionic liquid while stirring, wherein mass ratio of said organic solvent to said double-center quaternary ammonium salt ionic liquid is in the range of 0~100, said double-center quaternary ammonium salt ionic liquid has the following structural formula:

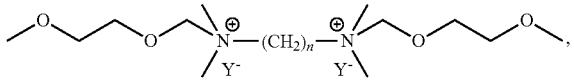

wherein n=2, 3 or 6, $Y^-$ is $BF_4^-$, $PF_6^-$, $(FSO_2)_2N^-$, $(CF_3SO_2)_2N^-$ or $CF_3SO_3^-$;

step 2: adding lithium salt to mixed liquid of organic solvent and double-center quaternary ammonium salt ionic liquid, stirring to dissolve lithium salt; wherein concentration of said lithium salt is in the range of 0.3 mol/L~1.2 mol/L.

The double-center quaternary ammonium salt ionic liquid has good stability. Preparation method is simple, and solvent of low toxicity is used during the process. So the preparation is low-cost, a large scale preparation can be easily achieved. Electrolyte using such double-center quaternary ammonium salt ionic liquid has good stability at high charging voltage.

BRIEF DESCRIPTION OF THE DRAWINGS

The FIGURE is charge-discharge curve of electrolyte prepared in Example 9.

DETAILED DESCRIPTION OF ILLUSTRATED EMBODIMENTS

Further description of double-center quaternary ammonium salt ionic liquid, preparation method thereof and use thereof will be illustrated, which combined with preferred embodiments and the drawings In one embodiment, double-center quaternary ammonium salt ionic liquid has the following structural formula:

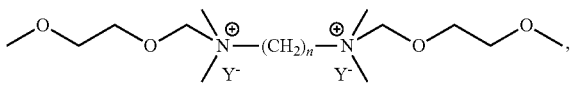

wherein n=2, 3 or 6, $Y^-$ is $BF_4^-$, $PF_6^-$, $(FSO_2)_2N^-$, $(CF_3SO_2)_2N^-$ or $CF_3SO_3^-$.

The double-center quaternary ammonium salt ionic liquid will not decompose even at a high temperature 400° C., indicating advantageous properties of good stability and non-flammable, thus ensuring safety in the use of it for electrolyte. Furthermore, electrochemical potential window range of such ionic liquid is out of 4V, indicating good chemical stability, thus can be used as electrolyte for super capacitors and lithium batteries.

In one embodiment, the method for preparing double-center quaternary ammonium salt ionic liquid, comprising:

Step S11: in protective atmosphere of nitrogen or argon, mixing double-center quaternary ammonium salt with haloalkane in a molar ratio of 1:2~1:2.5, then heating to 60~80° C.; reacting while stirring for 24~72 h; cooling reaction liquid and then washing with ethyl acetate for three times; drying the washed matter under vacuum to obtain purified alkyl double-center quaternary ammonium halide.

Wherein, double-center quaternary ammonium salt is N,N,N',N'-tetramethylethane-1,2-diamine, N,N,N',N'-tetramethyl-1,3-diaminopropane or N,N,N',N'-tetramethyl-1,6-hexanediamine. Haloalkane is methoxyethoxymethyl chloride

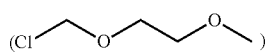

or methoxyethoxymethyl bromide

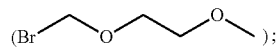

alkyl double-center quaternary ammonium halide is obtained by drying the washed matter under vacuum at 80° C. for 48 h.

It will be understood that, the reaction time is not limited to 24~72 h, but double-center quaternary ammonium salt should react with haloalkane completely; the reaction between double-center quaternary ammonium salt and haloalkane is not limited to conduct in protective atmosphere of nitrogen or argon, any inert gas may also be employed; the purification of alkyl double-center quaternary ammonium halide is carried out by washing cooled reaction liquid with ethyl acetate for three times, but not limited to, other methods in the art may also be employed to purify alkyl double-center quaternary ammonium halide.

Step S12, mixing the alkyl double-center quaternary ammonium halide prepared in Step S11 with salt having a formula of $M^+Y^-$ in a molar ratio of 1:2, then adding into deionized water; carrying out an ion exchange reaction between the alkyl double-center quaternary ammonium halide and salt having a formula of $M^+Y^-$ at room temperature for 8~24 h; subjecting mixed liquid obtained after the reaction of alkyl double-center quaternary ammonium halide with salt having a formula of $M^+Y^-$ to extraction with dichloromethane to get aqueous phase, until no precipitation occurs in the aqueous phase when saturated aqueous solution of $AgNO_3$ is added; evaporating and concentrating extracts in dichloromethane then drying under vacuum at 80° C. for 48 h to obtain double-center quaternary ammonium salt ionic liquid having the following structural formula:

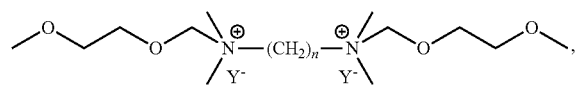

wherein n=2, 3 or 6, $M^+$ is $Na^+$, $K^+$ or $NH_4^+$, $Y^-$ is $BF_4^-$, $PF_6^-$, $(FSO_2)_2N^-$, $(CF_3SO_2)_2N^-$ or $CF_3SO_3^-$.

The overall equation is:

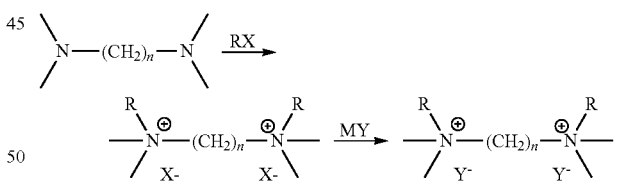

Wherein RX is meant to be

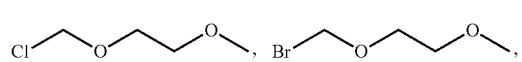

$X^-$ is meant to be $Cl^-$, $Br^-$, $R^-$ is meant to be

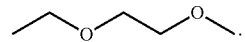

It will be understood that, the time of ion exchange reaction is not limited to 8~24 h, but alkyl double-center quaternary ammonium halide should react with salt having a formula of M+Y− completely; other commonly encountered solvents or methods in the art may also be employed to separate and purify double-center quaternary ammonium salt ionic liquid.

Preparation method of the double-center quaternary ammonium salt ionic liquid is simple, and solvent of low toxicity is used during the process. So the preparation is low-cost, a large scale preparation can be easily achieved.

In one embodiment, electrolyte comprises double-center quaternary ammonium salt ionic liquid, organic solvent and lithium salt.

Double-center quaternary ammonium salt ionic liquid has the following structural formula:

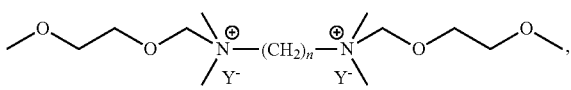

wherein n=2, 3 or 6, Y− is $BF_4^-$, $PF_6^-$, $(FSO_2)_2N^-$, $(CF_3SO_2)_2N^-$ or $CF_3SO_3^-$.

Mass ratio of organic solvent to double-center quaternary ammonium salt ionic liquid is greater than or equal to 0 and less than or equal to 100. Organic solvent is at least one of ethylene carbonate (EC), ethyl methyl carbonate (EMC), dimethyl carbonate (DMC) and ethyl propionate (EP).

Concentration of lithium salt is in the range of 0.3 mol/L~1.2 mol/L, preferably 1 mol/L. Lithium salt is at least one of lithium tetrafluoroborate ($LiBF_4$), lithium hexafluorophosphate ($LiPF_6$), lithium bis(trifluoromethanesulphonyl)imide (LiTFSI) and lithium bis(fluorosulfonyl)imide (LiFSI).

In one embodiment, method for preparing electrolyte, comprising:

Step S21: providing organic solvent, adding double-center quaternary ammonium salt ionic liquid while stirring, wherein mass ratio of the organic solvent to the double-center quaternary ammonium salt ionic liquid is greater than or equal to 0 and less than or equal to 100, thed double-center quaternary ammonium salt ionic liquid has the following structural formula:

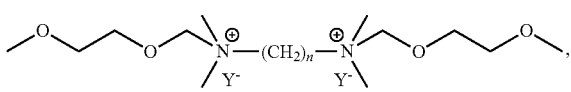

wherein n=2, 3 or 6, Y− is $BF_4^-$, $PF_6^-$, $(FSO_2)_2N^-$, $(CF_3SO_2)_2N^-$ or $CF_3SO_3^-$.

Organic solvent is at least one of ethylene carbonate (EC), ethyl methyl carbonate (EMC), dimethyl carbonate (DMC) and ethyl propionate (EP).

Preferably, Step S21 is carried out in protective atmosphere of inert gas, the inert gas can be nitrogen or argon.

Step S22: adding lithium salt to mixed liquid of organic solvent and double-center quaternary ammonium salt ionic liquid, stirring to dissolve lithium salt, concentration of lithium salt is in the range of 0.3 mol/L~1.2 mol/L.

Lithium salt is at least one of lithium tetrafluoroborate ($LiBF_4$), lithium hexafluorophosphate ($LiPF_6$), lithium bis(trifluoromethanesulphonyl)imide (LiTFSI) and lithium bis(fluorosulfonyl)imide (LiFSI). Concentration of lithium salt is preferably 1 mol/L.

As described herein, the double-center quaternary ammonium salt ionic liquid has good stability, and thus an electrolyte containing the double center quaternary ammonium salt ionic liquid has a high decomposition voltage. Lithium salt provides lithium ions when employed in lithium ion batteries or lithium ion capacitors, while organic solvent could reduce viscosity of electrolyte.

The present invention will be described below in detail referring to preferred embodiments.

Example 1

Double-center quaternary ammonium tetrafluoroborate (n=2) was prepared as follows.

To a 250-mL flask, 1 mol of N,N,N',N'-tetramethylethane-1,2-diamine and 2.1 mol of methoxyethoxymethyl chloride were added separately. In protective atmosphere of $N_2$, temperature was elevated to 60~80° C. The reaction was started and stirred for 24~72 h. After being allowed to stand and cool down, the reaction mixture was washed with ethyl acetate for three times. Drying under vacuum at 80° C., light yellow solid was obtained in a yield of 78%.

To a 500-mL flask, 0.5 mol of alkyl quaternary ammonium chloride, 1 mol of $NaBF_4$ and 100-150 mL of deionized water were added at room temperature while stirring for 8-24 h. After the reaction, mixed liquid was subjected to extraction with 250 mL of dichloromethane for three times, liquid extracts were combined. Then back-extracted with 60 mL of deionized water each time to get aqueous phase, until no further precipitation occurs in the aqueous phase when saturated aqueous solution of $AgNO_3$ was added. Dichloromethane phase was evaporated and concentrated by rotary evaporator then dried under vacuum at 80° C. for 48 h to give light yellow solid.

When n=2, hydrogen-1 nuclear magnetic resonance (NMR) spectrum of double-center quaternary ammonium tetrafluoroborate shows:

$^1$H NMR (($CD_3$)$_2$CO, s400 MHz, ppm): 5.85 (s, 4H), 4.34 (m, 4H), 3.48 (s, 12H), 3.44 (m, 8H), 3.24 (s, 6H).

Example 2

Double-center quaternary ammonium hexafluorophosphate was prepared as follows.

To a 250-mL flask, 1 mol of N,N,N',N'-tetramethyl-1,3-diaminopropane and 2.1 mol of methoxyethoxymethyl bromide were added separately. In protective atmosphere of $Ar_2$, temperature was elevated to 60~80° C. The reaction was started and stirred for 24~72 h. After being allowed to stand and cool down, the reaction mixture was washed with ethyl acetate for three times. Drying under vacuum at 80° C., light yellow solid was obtained in a yield of 80%.

To a 500-mL flask, 0.5 mol of alkyl quaternary ammonium bromide, 1 mol of $KPF_6$ and 100-150 mL of deionized water were added at room temperature while stirring for 8-24 h. After the reaction, mixed liquid was subjected to extraction with 250 mL of dichloromethane for three times, liquid extracts were combined. Then back-extracted with 60 mL of deionized water each time to get aqueous phase, until no further precipitation occurs in the aqueous phase when saturated aqueous solution of $AgNO_3$ was added. Dichloromethane phase was evaporated and concentrated by rotary evaporator then dried under vacuum at 80° C. for 48 h to give light yellow solid.

When n=3, hydrogen-1 nuclear magnetic resonance (NMR) spectrum of double-center quaternary ammonium hexafluorophosphate shows:

$^1$H NMR (($CD_3$)$_2$CO, 400 MHz, ppm): 5.84 (s, 4H), 3.76 (m, 4H), 2.64 (m, 2H), 3.46 (s, 12H), 3.43 (m, 8H), 3.24 (s, 6H).

Example 3

Double-center quaternary ammonium trifluoromethylsulfonyl imide was prepared as follows.

To a 250-mL flask, 1 mol of N,N,N',N'-tetramethyl-1,6-hexanediamine and 2.1 mol of methoxyethoxymethyl chloride were added separately. In protective atmosphere of $N_2$, temperature was elevated to 60~80° C. The reaction was started and stirred for 24~72 h. After being allowed to stand and cool down, the reaction mixture was washed with ethyl acetate for three times. Drying under vacuum at 80° C., light yellow solid was obtained in a yield of 78%.

To a 500-mL flask, 0.5 mol of alkyl quaternary ammonium chloride, potassium trifluoromethanesulfonyl imide (319 g, 1 mol; KTFSI) and 100-150 mL of deionized water were added at room temperature while stirring for 8-24 h. After the reaction, mixed liquid was subjected to extraction with 250 mL of dichloromethane for three times, liquid extracts were combined. Then back-extracted with 60 mL of deionized water each time to get aqueous phase, until no further precipitation occurs in the aqueous phase when saturated aqueous solution of $AgNO_3$ was added. Dichloromethane phase was evaporated and concentrated by rotary evaporator then dried under vacuum at 80° C. for 48 h to give light yellow solid.

When n=6, hydrogen-1 nuclear magnetic resonance (NMR) spectrum of double-center quaternary ammonium trifluoromethylsulfonyl imide shows:

$^1$H NMR (($CD_3$)$_2$CO, 400 MHz, ppm): 5.84 (s, 4H), 3.76 (m, 4H), 2.23 (m, 4H), 1.79 (m, 4H), 3.46 (s, 12H), 3.43 (m, 8H), 3.24 (s, 6H).

Example 4

Double-center quaternary ammonium trifluoromethansulphonate was prepared as follows.

To a 250-mL flask, 1 mol of N,N,N',N'-tetramethylethane-1,2-diamine and 2.1 mol of methoxyethoxymethyl chloride were added separately. In protective atmosphere of $N_2$, temperature was elevated to 60~80° C. The reaction was started and stirred for 24~72 h. After being allowed to stand and cool down, the reaction mixture was washed with ethyl acetate for three times. Drying under vacuum at 80° C., light yellow solid was obtained in a yield of 78%.

To a 500-mL flask, 0.5 mol of alkyl quaternary ammonium chloride, 1 mol of $CF_3SO_3Na$ and 100-150 mL of deionized water were added at room temperature while stirring for 8-24 h. After the reaction, mixed liquid was subjected to extraction with 250 mL of dichloromethane for three times, liquid extracts were combined. Then back-extracted with 60 mL of deionized water each time to get aqueous phase, until no further precipitation occurs in the aqueous phase when saturated aqueous solution of $AgNO_3$ was added. Dichloromethane phase was evaporated and concentrated by rotary evaporator then dried under vacuum at 80° C. for 48 h to give light yellow solid.

When n=2, hydrogen-1 nuclear magnetic resonance (NMR) spectrum of double-center quaternary ammonium trifluoromethansulphonate shows:

$^1$H NMR (($CD_3$)$_2$CO, 400 MHz, ppm): 5.86 (s, 4H), 4.34 (m, 4H), 3.47 (s, 12H), 3.44 (m, 8H), 3.25 (s, 6H).

Example 5

Double-center quaternary ammonium tetrafluoroborate (n=3) was prepared as follows.

To a 250-mL flask, N,N,N',N'-tetramethyl-1,3-diaminopropane and 2.5 mol of methoxyethoxymethyl bromide were added separately. In protective atmosphere of $Ar_2$, temperature was elevated to 60~80° C. The reaction was started and stirred for 24~72 h. After being allowed to stand and cool down, the reaction mixture was washed with ethyl acetate for three times. Drying under vacuum at 80° C., light yellow solid intermediate product, i.e. alkyl double-center quaternary ammonium chloride was obtained.

To a 500-mL flask, 0.5 mol of alkyl double-center quaternary ammonium bromide, 1 mol of KBF4 and 100-150 mL of deionized water were added at room temperature while stirring for 8-24 h. After the reaction, mixed liquid was subjected to extraction with 250 mL of dichloromethane for three times, liquid extracts were combined. Then back-extracted with 60 mL of deionized water each time to get aqueous phase, until no further precipitation occurs in the aqueous phase when saturated aqueous solution of $AgNO_3$ was added. Dichloromethane phase was evaporated and concentrated by rotary evaporator then dried under vacuum at 80° C. for 48 h to give light yellow solid.

When n=3, hydrogen-1 nuclear magnetic resonance (NMR) spectrum of double-center quaternary ammonium tetrafluoroborate shows:

$^1$H NMR (($CD_3$)$_2$CO, 400 MHz, ppm): 5.84 (s, 4H), 3.76 (m, 4H), 2.64 (m, 2H), 3.46 (s, 12H), 3.43 (m, 8H), 3.24 (s, 6H).

Example 6

Double-center quaternary ammonium hexafluorophosphate was prepared as follows.

To a 250-mL flask, 1 mol of N,N,N',N'-tetramethyl-1,6-hexanediamine and methoxyethoxymethyl bromide were added separately. In protective atmosphere of $N_2$, temperature was elevated to 60~80° C. The reaction was started and stirred for 24~72 h. After being allowed to stand and cool down, the reaction mixture was washed with ethyl acetate for three times. Drying under vacuum at 80° C., light yellow solid intermediate product, i.e. alkyl double-center quaternary ammonium bromide was obtained.

To a 500-mL flask, 0.5 mol of alkyl double-center quaternary ammonium bromide, 1 mol of $KPF_6$ and 100-150 mL of deionized water were added at room temperature while stirring for 8-24 h. After the reaction, mixed liquid was subjected to extraction with 250 mL of dichloromethane for three times, liquid extracts were combined. Then back-extracted with 60 mL of deionized water each time to get aqueous phase, until no further precipitation occurs in the aqueous phase when saturated aqueous solution of $AgNO_3$ was added. Dichloromethane phase was evaporated and concentrated by rotary evaporator then dried under vacuum at 80° C. for 48 h to give light yellow solid.

When n=6, hydrogen-1 nuclear magnetic resonance (NMR) spectrum of double-center quaternary ammonium hexafluorophosphate shows:

$^1$H NMR (($CD_3$)$_2$CO, 400 MHz, ppm): 5.84 (s, 4H), 3.75 (m, 4H), 2.23 (m, 4H), 1.78 (m, 4H), 3.46 (s, 12H), 3.43 (m, 8H), 3.24 (s, 6H).

Example 7

Double-center quaternary ammonium bis(trifluoromethylsulfonyl)imide was prepared as follows.

To a 250-mL flask, 1 mol of N,N,N',N'-tetramethyl-1,6-hexanediamine and 2.4 mol of methoxyethoxymethyl chloride were added separately. In protective atmosphere of $N_2$, temperature was elevated to 60~80° C. The reaction was started and stirred for 24~72 h. After being allowed to stand and cool down, the reaction mixture was washed with ethyl acetate for three times. Drying under vacuum at 80° C., light yellow solid intermediate product, i.e. alkyl double-center quaternary ammonium chloride was obtained.

To a 500-mL flask, 0.5 mol of alkyl quaternary ammonium chloride, potassium bis(trifluoromethanesulfonyl)imide (319 g, 1 mol; $(CF_3SO_2)_2NK$) and 100-150 mL of deionized water were added at room temperature while stirring for 8-24 h. After the reaction, mixed liquid was subjected to extraction with 250 mL of dichloromethane for three times, liquid extracts were combined. Then back-extracted with 60 mL of deionized water each time to get aqueous phase, until no further precipitation occurs in the aqueous phase when saturated aqueous solution of $AgNO_3$ was added. Dichloromethane phase was evaporated and concentrated by rotary evaporator then dried under vacuum at 80° C. for 48 h to give light yellow solid.

When n=6, hydrogen-1 nuclear magnetic resonance (NMR) spectrum of double-center quaternary ammonium bis(trifluoromethylsulfonyl)imide shows:

$^1$H NMR (($CD_3)_2CO$, 400 MHz, ppm): 5.84 (s, 4H), 3.76 (m, 4H), 2.23 (m, 4H), 1.79 (m, 4H), 3.46 (s, 12H), 3.43 (m, 8H), 3.24 (s, 6H).

Example 8

Double-center quaternary ammonium bis(fluorosulfonyl) imide was prepared as follows.

To a 250-mL flask, 1 mol of N,N,N',N'-tetramethylethane-1,2-diamine and 2.5 mol of methoxyethoxymethyl chloride were added separately. In protective atmosphere of $N_2$, temperature was elevated to 60~80° C. The reaction was started and stirred for 24~72 h. After being allowed to stand and cool down, the reaction mixture was washed with ethyl acetate for three times. Drying under vacuum at 80° C., light yellow solid intermediate product, i.e. alkyl double-center quaternary ammonium chloride was obtained.

To a 500-mL flask, 0.5 mol of alkyl double-center quaternary ammonium chloride, 1 mol of $(FSO_2)_2NNa$ and 100-150 mL of deionized water were added at room temperature while stirring for 8-24 h. After the reaction, mixed liquid was subjected to extraction with 250 mL of dichloromethane for three times, liquid extracts were combined. Then back-extracted with 60 mL of deionized water each time to get aqueous phase, until no further precipitation occurs in the aqueous phase when saturated aqueous solution of $AgNO_3$ was added. Dichloromethane phase was evaporated and concentrated by rotary evaporator then dried under vacuum at 80° C. for 48 h to give light yellow solid.

When n=6, hydrogen-1 nuclear magnetic resonance (NMR) spectrum of double-center quaternary ammonium bis(fluorosulfonyl)imide shows:

$^1$H NMR (($CD_3)_2CO$, 400 MHz, ppm): 5.84 (s, 4H), 3.75 (m, 4H), 2.24 (m, 4H), 1.78 (m, 4H), 3.45 (s, 12H), 3.42 (m, 8H), 3.24 (s, 6H).

Example 9

In protective atmosphere of $N_2$, organic solvent was prepared by mixing ethylene carbonate (EC), ethyl methyl carbonate (EMC), dimethyl carbonate (DMC) and propylene carbonate (PC) in a molar ratio of 2:3:1:2 (abbr. mixed solvent$_{EC+EMC+DMC+PC}$). Double-center quaternary ammonium tetrafluoroborate ionic liquid was added according to the mass ratio of mixed solvent$_{EC+EMC+DMC+PC}$: double-center quaternary ammonium salt ionic liquid=10:1. The mixture was heated to 40° C. and stirred to get uniform organic phase.

At last, a certain amount of lithium salt ($LiBF_4$) was added, the molar concentration of lithium salt was 1 mol/L (amount of lithium salt was determined by volume of organic phase $V_{EC+EMC+DMC+PC+double\text{-}center\ quaternary\ ammonium\ salt\ ionic\ liquid}$). Lithium salt was completely dissolved by stirring constantly. The desired organic electrolyte was obtained.

Referring to the FIGURE, the FIGURE is charge-discharge curve of button cell comprising graphene as electrode material and organic electrolyte prepared in Example 9. The charge-discharge test was performed on a CHI660A electrochemical workstation at a constant current 0.75 A/g. The electrochemical potential window ranges from 0 to 2.7 V.

It can be seen from the FIGURE that conventional test is conducted on the super capacitor comprising such electrolyte and electrode material to obtain standard charge-discharge curve, indicating that electrolyte as prepared is suitable for super capacitors, and electrolyte has good stability at a charging voltage of 2.7 V.

Example 10

In protective atmosphere of $Ar_2$, 100 mL of double-center quaternary ammonium hexafluorophosphate ionic liquid was added and heated to 40° C. while stirring. A certain amount of lithium salt ($LiPF_6$) was added, the molar concentration of lithium salt was 1 mol/L. Lithium salt was completely dissolved by stirring constantly. The desired organic electrolyte was obtained.

Example 11

In protective atmosphere of $N_2$ (or $Ar_2$), organic solvent comprising ethylene carbonate (EC), ethyl methyl carbonate (EMC), dimethyl carbonate (DMC) and propylene carbonate (PC) in a molar ratio of 2:3:1:2 (abbr. mixed solvent$_{EC+EMC+DMC+PC}$) was prepared. Double-center quaternary ammonium hexafluorophosphate ionic liquid was added according to the mass ratio of mixed solvent$_{EC+EMC+DMC+PC}$: double-center quaternary ammonium salt ionic liquid=1:100. The mixture was heated to 40° C. and stirred to get uniform organic phase. At last, a certain amount of lithium salt (LiTFSI) was added, the molar concentration of lithium salt was 0.3 mol/L (amount of lithium salt was determined by volume of organic phase $V_{EC+EMC+DMC+PC+double\text{-}center\ quaternary\ ammonium\ salt\ ionic\ liquid}$). Lithium salt was completely dissolved by stirring constantly. The desired organic electrolyte was obtained.

Example 12

In protective atmosphere of $N_2$ (or $Ar_2$), organic solvent comprising ethylene carbonate (EC), ethyl methyl carbonate (EMC), dimethyl carbonate (DMC) and propylene carbonate (PC) in a molar ratio of 2:3:1:2 (abbr. mixed solvent$_{EC+EMC+DMC+PC}$) was prepared. Double-center quaternary ammonium bis(trifluoromethylsulfonyl)imide ionic liquid was added according to the mass ratio of mixed solvent$_{EC+EMC+DMC+PC}$: double-center quaternary ammonium salt ionic liquid=1:10. The mixture was heated to 40° C. and stirred to get uniform organic phase. At last, a certain amount of lithium salt (such as $LiBF_4$, $LiPF_6$, LiTFSI, LiFSI) was added, the molar concentration of lithium salt was 1.2 mol/L (amount of lithium salt was determined by volume of organic phase $V_{EC+EMC+DMC+PC+double\text{-}center\ quaternary\ ammonium\ salt\ ionic\ liquid}$). Lithium salt was completely dissolved by stirring constantly. The desired organic electrolyte was obtained.

Example 13

In protective atmosphere of $N_2$ (or $Ar_2$), organic solvent comprising ethylene carbonate (EC), ethyl methyl carbonate (EMC), dimethyl carbonate (DMC) and propylene carbonate (PC) in a molar ratio of 2:3:1:2 (abbr. mixed solvent$_{EC+EMC+DMC+PC}$) was prepared. Double-center quaternary ammonium bis(fluorosulfonyl)imide ionic liquid was added according to the mass ratio of mixed solvent$_{EC+EMC+DMC+PC}$: double-center quaternary ammonium salt ionic liquid=1:1. The mixture was heated to 40° C. and stirred to get uniform organic phase. At last, a certain amount of lithium salt (LiTFSI and LiFSI) was added, the molar concentration of lithium salt was 1 mol/L (amount of lithium salt was determined by volume of organic phase $V_{EC+EMC+DMC+PC+double\text{-}center\ quaternary\ ammonium\ salt\ ionic\ liquid}$). Lithium salt was completely dissolved by stirring constantly. The desired organic electrolyte was obtained.

Example 14

In protective atmosphere of $N_2$ (or $Ar_2$), organic solvent comprising ethylene carbonate (EC), ethyl methyl carbonate (EMC), dimethyl carbonate (DMC) and propylene carbonate (PC) in a molar ratio of 2:3:1:2 (abbr. mixed solvent$_{EC+EMC+DMC+PC}$) was prepared. Double-center quaternary ammonium bis(fluorosulfonyl)imide ionic liquid was added according to the mass ratio of mixed solvent$_{EC+EMC+DMC+PC}$: double-center quaternary ammonium salt ionic liquid=40:1. The mixture was heated to 40° C. and stirred to get uniform organic phase. At last, a certain amount of lithium salt (LiFSI) was added, the molar concentration of lithium salt was 1 mol/L (amount of lithium salt was determined by volume of organic phase $V_{EC+EMC+DMC+PC+double\text{-}center\ quaternary\ ammonium\ salt\ ionic\ liquid}$). Lithium salt was completely dissolved by stirring constantly. The desired organic electrolyte was obtained.

Example 15

In protective atmosphere of $N_2$ (or $Ar_2$), organic solvent comprising ethylene carbonate (EC), ethyl methyl carbonate (EMC), dimethyl carbonate (DMC) and propylene carbonate (PC) in a molar ratio of 2:3:1:2 (abbr. mixed solvent$_{EC+EMC+DMC+PC}$) was prepared. Double-center quaternary ammonium hexafluorophosphate ionic liquid was added according to the mass ratio of mixed solvent$_{EC+EMC+DMC+PC}$: double-center quaternary ammonium salt ionic liquid=70:1. The mixture was heated to 40° C. and stirred to get uniform organic phase. At last, a certain amount of lithium salt (LiTFSI) was added, the molar concentration of lithium salt was 1 mol/L (amount of lithium salt was determined by volume of organic phase $V_{EC+EMC+DMC+PC+double\text{-}center\ quaternary\ ammonium\ salt\ ionic\ liquid}$). Lithium salt was completely dissolved by stirring constantly. The desired organic electrolyte was obtained.

Example 16

In protective atmosphere of $N_2$ (or $Ar_2$), organic solvent comprising ethylene carbonate (EC), ethyl methyl carbonate (EMC), dimethyl carbonate (DMC) and propylene carbonate (PC) in a molar ratio of 2:3:1:2 (abbr. mixed solvent$_{EC+EMC+DMC+PC}$) was prepared. Double-center quaternary ammonium tetrafluoroborate ionic liquid was added according to the mass ratio of mixed solvent$_{EC+EMC+DMC+PC}$: double-center quaternary ammonium salt ionic liquid=100:1. The mixture was heated to 40° C. and stirred to get uniform organic phase. At last, a certain amount of lithium salt ($LiBF_4$) was added, the molar concentration of lithium salt was 1 mol/L (amount of lithium salt was determined by volume of organic phase $V_{EC+EMC+DMC+PC+double\text{-}center\ quaternary\ ammonium\ salt\ ionic\ liquid}$). Lithium salt was completely dissolved by stirring constantly. The desired organic electrolyte was obtained.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A double-center quaternary ammonium salt ionic liquid having the following structural formula:

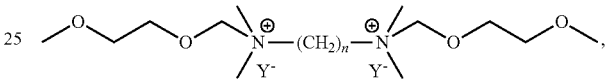

wherein n=2, 3 or 6, $Y^-$ is $BF_4^-$, $PF_6^-$, $(FSO_2)_2N^-$, $(CF_3SO_2)_2N^-$ or $CF_3SO_3^-$.

2. A method for preparing double-center quaternary ammonium salt ionic liquid, comprising:
step 1: mixing double-center quaternary ammonium salt with haloalkane in a molar ratio of 1:2~1:2.5, then heating to 60~80° C.; reacting while stirring to obtain alkyl double-center quaternary ammonium halide, wherein said double-center quaternary ammonium salt is N,N,N',N'-tetramethylethane-1,2-diamine, N,N,N',N'-tetramethyl-1,3-diaminopropane or N,N,N',N'-tetramethyl-1,6-hexanediamine; said haloalkane is methoxyethoxymethyl chloride or methoxyethoxymethyl bromide;
step 2: mixing the alkyl double-center quaternary ammonium halide prepared in step 1 with salt having a formula of $M^+Y^-$ in a molar ratio of 1:2, then adding into deionized water; carrying out an ion exchange reaction while stirring; purifying and then obtaining a double-center quaternary ammonium salt ionic liquid having the following structural formula:

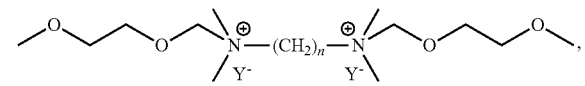

wherein n=2, 3 or 6, $M^+$ is $Na^+$, $K^+$ or $NH_4^+$, $Y^-$ is $BF_4^-$, $PF_6^-$, $(FSO_2)_2N^-$, $(CF_3SO_2)_2N^-$ or $CF_3SO_3^-$.

3. The method for preparing double-center quaternary ammonium salt ionic liquid according to claim 2, wherein in step 1, the step of reacting said double-center quaternary ammonium salt with haloalkane is carried out for 24~72 h; reaction liquid is cooled and then washed with ethyl acetate to get washed matter; the washed matter is dried under vacuum to obtain purified alkyl double-center quaternary ammonium halide.

4. The method for preparing double-center quaternary ammonium salt ionic liquid according to claim 2, wherein in step 1, the step of reacting said double-center quaternary ammonium salt with haloalkane is carried out in protective atmosphere of nitrogen or argon.

5. The method for preparing double-center quaternary ammonium salt ionic liquid according to claim 2, wherein in step 2, the ion exchange reaction is carried out at room temperature for 8~24 h.

6. The method for preparing double-center quaternary ammonium salt ionic liquid according to claim 2, wherein the step of purifying of step 2 comprises:
    subjecting mixed liquid obtained after the reaction of alkyl double-center quaternary ammonium halide with salt having a formula of M⁺Y⁻ to extraction with dichloromethane to get aqueous phase, until no precipitation occurs in the aqueous phase when saturated aqueous solution of $AgNO_3$ is added;
    evaporating and concentrating extracts in dichloromethane then drying under vacuum to obtain double-center quaternary ammonium salt ionic liquid.

7. An electrolyte, comprising double-center quaternary ammonium salt ionic liquid, organic solvent and lithium salt, wherein said double-center quaternary ammonium salt ionic liquid has the following structural formula:

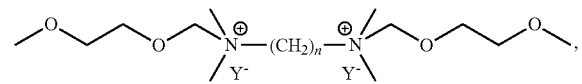

wherein n=2, 3 or 6, Y⁻ is $BF_4^-$, $PF_6^-$, $(FSO_2)_2N^-$, $(CF_3SO_2)_2N^-$ or $CF_3SO_3^-$, mass ratio of said organic solvent to said double-center quaternary ammonium salt ionic liquid is in the range of 0~100, concentration of said lithium salt is in the range of 0.3 mol/L~1.2 mol/L.

8. The electrolyte according to claim 7, wherein said lithium salt is at least one of lithium tetrafluoroborate, lithium hexafluorophosphate, lithium bis(trifluoromethanesulphonyl)imide and lithium bis(fluorosulfonyl)imide.

9. The electrolyte according to claim 7, wherein said organic solvent is at least one of ethylene carbonate, ethyl methyl carbonate, dimethyl carbonate and ethyl propionate.

* * * * *